United States Patent
Okada (10) Patent No.: US 8,256,552 B2
(45) Date of Patent: Sep. 4, 2012

(54) CAR BATTERY ARRAY HAVING A PLURALITY OF CONNECTED BATTERIES

(75) Inventor: Wataru Okada, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 521 days.

(21) Appl. No.: 12/498,651

(22) Filed: Jul. 7, 2009

(65) Prior Publication Data

US 2010/0000816 A1 Jan. 7, 2010

(30) Foreign Application Priority Data

Jul. 7, 2008 (JP) ................................. 2008-177414

(51) Int. Cl.
*B60R 16/04* (2006.01)
*B60K 11/06* (2006.01)
(52) U.S. Cl. ......... 180/68.5; 180/68.2; 320/112; 429/99
(58) Field of Classification Search ................. 180/68.2, 180/68.5; 320/107, 112; 429/99
See application file for complete search history.

(56) References Cited

U.S. PATENT DOCUMENTS

| | | | | |
|---|---|---|---|---|
| 5,392,873 A * | 2/1995 | Masuyama et al. | ......... | 180/68.5 |
| 5,534,364 A * | 7/1996 | Watanabe et al. | ......... | 429/61 |
| 5,620,057 A * | 4/1997 | Klemen et al. | ......... | 180/68.5 |
| 5,639,571 A * | 6/1997 | Waters et al. | ......... | 429/71 |
| 6,189,635 B1 * | 2/2001 | Schuler et al. | ......... | 180/68.5 |
| 6,227,322 B1 * | 5/2001 | Nishikawa | ......... | 180/68.5 |
| 6,632,560 B1 * | 10/2003 | Zhou et al. | ......... | 429/99 |
| 6,662,891 B2 * | 12/2003 | Misu et al. | ......... | 180/68.1 |
| 6,896,995 B2 * | 5/2005 | Saito | ......... | 429/163 |
| 7,401,669 B2 * | 7/2008 | Fujii et al. | ......... | 180/65.1 |
| 7,511,455 B2 * | 3/2009 | Yoneda | ......... | 320/112 |
| 7,605,562 B2 * | 10/2009 | Kim | ......... | 320/107 |
| 7,764,047 B2 * | 7/2010 | Jeon et al. | ......... | 320/112 |
| 7,900,727 B2 * | 3/2011 | Shinmura | ......... | 180/68.1 |
| 7,926,602 B2 * | 4/2011 | Takasaki | ......... | 180/68.5 |
| 7,931,105 B2 * | 4/2011 | Sato et al. | ......... | 180/68.5 |
| 8,076,020 B2 * | 12/2011 | Goto et al. | ......... | 429/129 |
| 2007/0284167 A1 * | 12/2007 | Watanabe et al. | ......... | 180/68.5 |
| 2008/0173488 A1 * | 7/2008 | Takasaki | ......... | 180/68.5 |
| 2008/0280194 A1 * | 11/2008 | Okada | ......... | 429/99 |
| 2008/0318119 A1 * | 12/2008 | Watanabe et al. | ......... | 429/99 |

FOREIGN PATENT DOCUMENTS

JP 2008-53149 3/2008

* cited by examiner

*Primary Examiner* — John R Olszewski
(74) *Attorney, Agent, or Firm* — Wenderoth, Lind & Ponack, LLP (57) ABSTRACT

A car battery array is provided with battery blocks (2) having a plurality of connected batteries (1), a first load-bearing plate (3) on top of which the battery blocks are mounted, a second load-bearing plate (4) attached on both sides to the first load-bearing plate and covering the tops of the battery blocks, and a reinforcing rod (5) that connects with the second load-bearing plate and the battery blocks to attach the second load-bearing plate to the battery blocks. The battery blocks are disposed in a battery compartment (6) established inside the first and second load-bearing plates, which are joined together on both sides. The battery blocks are mounted on top of the first load-bearing plate and connected to the second load-bearing plate via the reinforcing rod to support the battery block load with the first load-bearing plate and the second load-bearing plate.

20 Claims, 6 Drawing Sheets

FIG. 1

PRIOR ART

CAR BATTERY ARRAY HAVING A PLURALITY OF CONNECTED BATTERIES

BACKGROUND OF THE INVENTION

1. Field of the Invention

The present invention relates to a car battery array carried on-board an automobile to supply power to the car driving motor.

2. Description of the Related Art

A car battery array has many individual battery cells connected in series to raise the output voltage. The purpose is to supply a large amount of power to the driving motor. This type of battery array is provided with many high capacity battery cells resulting in a large overall weight. Individual battery cells are housed in an external case and carried on-board the automobile. A battery array with this type of structure is described, for example, in Japanese Laid-Open Patent Publication No. JP 2008-53149 A.

Figure 1:
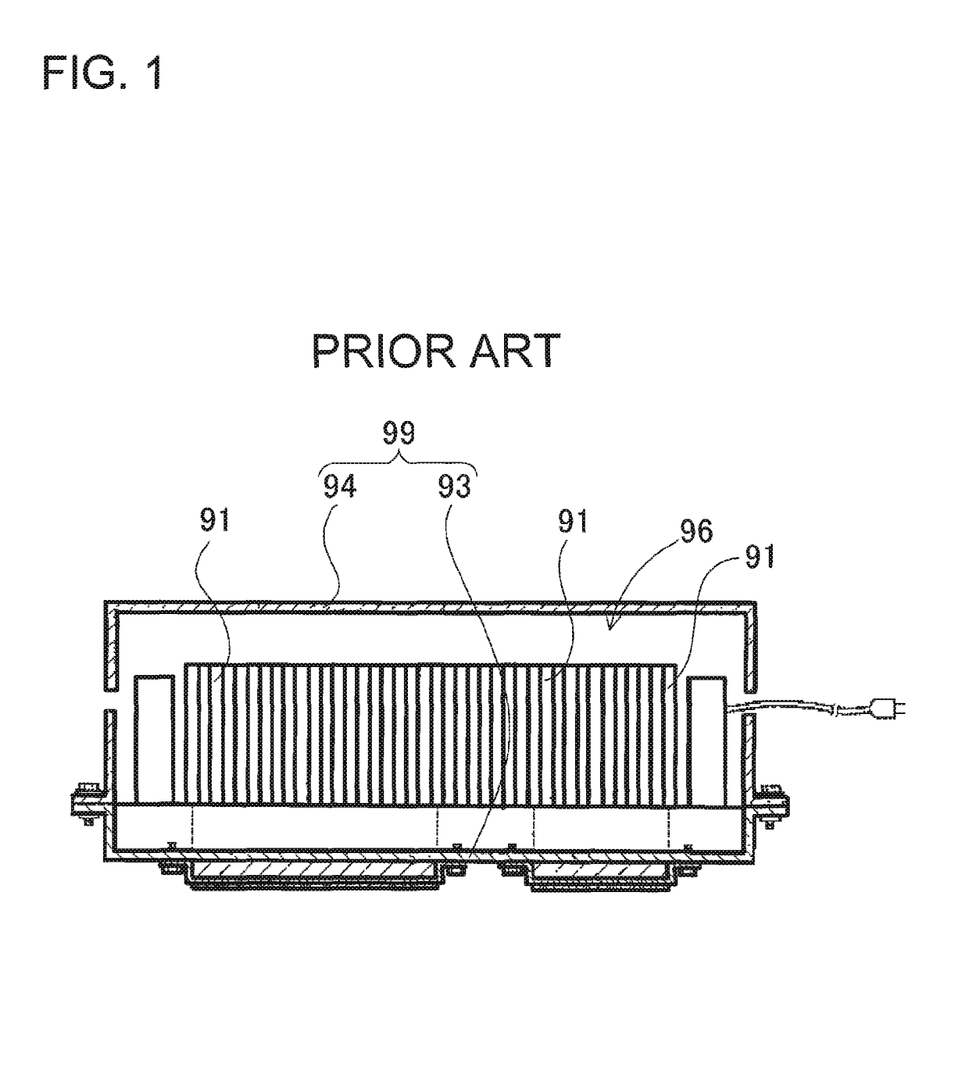
FIG. 1 is a cross-sectional view of a prior art car battery array.

FIG. 1 shows the battery array of JP 2008-53149 A. This battery array has many battery cells 91 stacked together and housed in an external case 99. The external case 99 has a lower frame plate 93 and an upper cover plate 94. The cover plate 94 is attached to the frame plate 93 to form the external case 99 having a battery compartment 96. Battery cells 91 housed in this external case 99 are mounted on top of the frame plate 93. In this type of battery array configuration, the entire weight of the heavy battery cells is placed on the frame plate. Consequently, the frame plate must have an extremely strong composition, and more specifically, it must be made of thick metal plate. This has the drawback that the external case becomes extremely heavy.

The present invention was developed with the object of correcting this drawback. Thus, it is a primary object of the present invention to provide a car battery array that has an overall light weight and strong construction while housing many heavy batteries.

SUMMARY OF THE INVENTION

The car battery array of the present invention is provided with the following structure to achieve the object described above. The car battery array is provided with battery blocks 2, 32 having a plurality of connected batteries 1; a first load-bearing plate 3, 33 on which battery blocks 2, 32 are mounted; a second load-bearing plate 4, 34 that attaches to both sides of the first load-bearing plate 3, 33 and covers the upper surfaces of the battery blocks 2, 32; and a reinforcing rod 5, disposed between, and connected to the second load-bearing plate 4, 34 and the battery blocks 2, 32 to join the second load-bearing plate 2, 32 to the battery blocks 2, 32. The battery array has both sides of the first load-bearing plate 3, 33 and the second load-bearing plate 4, 34 connected together, a battery compartment 6, 36 is established inside the load-bearing plates, and battery blocks 2, 32 are disposed in the battery compartment. Battery blocks 2, 32 disposed in the battery compartment 6, 36 are mounted on the first load-bearing plate 3, 33 and are joined to the second load-bearing plate 4, 34 via the reinforcing rod 5, 35. Therefore, battery block load is supported by the first load-bearing plate 3, 33 and the second load-bearing plate 4, 34.

This battery array has an overall light weight but strong construction while housing many heavy batteries. This is because the battery blocks of this battery array are mounted on the first load-bearing plate as well as being fixed to the second load-bearing plate through the reinforcing rod. In this configuration, support of the battery block load can be divided between the first load-bearing plate and the second load-bearing plate. Further, a structure that establishes a compartment for the battery blocks by joining the first load-bearing plate and the second load-bearing plate forms a sturdy box shape where the first load-bearing plate and the second load-bearing plate reinforce each other to support the heavy battery blocks. The above and further objects of the present invention as well as the features thereof will become more apparent from the following detailed description to be made in conjunction with the accompanying drawings.

DETAILED DESCRIPTION OF THE EMBODIMENT(S)

The car battery array has a second load-bearing plate 4, 34 with a trough-shaped structure having side-walls 4A, 34A on both sides. A reinforcing rod 5, 35 is disposed between the two side-walls 4A, 34A in a lengthwise direction along which the side-walls 4A, 34A extend. This reinforcing rod 5, 35 can be fixed to the battery blocks 2, 32 and to the base section 4B, 34B of the second load-bearing plate 4, 34.

In this battery array, since the second load-bearing plate is reinforced on both sides by side-walls, and since battery blocks are fixed to the base section between the side-walls by a reinforcing rod, the second load-bearing plate can support the battery blocks via the base section reinforcing rod in a sturdy configuration. In particular, since the second load-bearing plate is reinforced by side-walls on both sides of the reinforcing rod attachment section, the second load-bearing plate can support heavy battery blocks in a robust fashion.

In the car battery array, the first load-bearing plate 3, 33 and the second load-bearing plate 4, 34 can be trough-shaped metal plates.

In the car battery array, battery blocks 2, 32 can be provided with a plurality of individual battery cells 1 stacked together, and with endplates 22 that sandwich both end-planes of the battery cell stack between the endplates 22. Further, the first load-bearing plate 3, 33 and the second load-bearing plate 4, 34 can be fixed to the endplates 22. In this battery array, battery blocks can be solidly fixed to the first load-bearing plate and the second load-bearing plate via the endplates.

In the car battery array, the reinforcing rods 35 can be exhaust ducts 37 for gas discharged from the battery blocks 32. The exhaust duct reinforcing rods 35 can be fixed to the endplates 22 and the second load-bearing plate 34 to connect the second load-bearing plate 34 to the battery blocks 32. In this battery array, since the exhaust ducts 37 serve a dual purpose as reinforcing rods 35, there is no need for special-purpose hardware used only to connect battery blocks to the second load-bearing plate. As a result, battery blocks can be solidly fixed to the second load-bearing plate with a simple structure.

In the car battery array, battery blocks 2 are disposed in a plurality of rows and mounted between the first load-bearing plate 3 and the second load-bearing plate 4. Cooling ducts 8 are established between adjacent battery blocks 2, and the cooling duct sealing plate 12 that closes off the top of the cooling ducts 8 can be the reinforcing rod 5. In this battery array, the sealing plate reinforcing rod 5 can be fixed to the endplates 22 and to the second load-bearing plate 4 to connect the second load-bearing plate 4 to the battery blocks 2. In this battery array, since the cooling duct sealing plate serves a dual purpose as a reinforcing rod, cooling ducts can be established between adjacent battery blocks via the reinforcing rod, and battery blocks on both sides of the reinforcing rod can be solidly attached to the second load-bearing plate via the reinforcing rod.

In the car battery array, the tops of the battery blocks 2 can be fixed to the reinforcing rod 5 at positions offset from directly above lower attachment points, where the bottoms of the battery blocks 2 are attached to the first load-bearing plate 3. In this battery array, since battery block upper and lower attachment points are offset, attachment points are spread over different regions to prevent resonant vibration of attachment materials. In addition, spatial distribution of attachment points avoids local concentration of the load on the battery blocks and allows the heavy battery blocks to be supported by the first load-bearing plate and the second load-bearing plate without inducing excessive stress.

In the car battery array, the first load-bearing plate 3, 33 and the second load-bearing plate 4, 34 are trough-shaped with side-walls 3A, 33A, 4A, 34A on both sides. Second load-bearing plate side-walls 4A, 34A can be joined to first load-bearing plate side-walls 3A, 33A and base sections to establish an external case 9, 39 with an interior battery block storage compartment 6, 36. Side-walls of the battery blocks 2, 32 are disposed with separation from external case side-walls 3A, 33A, 4A, 34A to allow side cooling ducts 8A, 38A to be established between the battery blocks 2, 32 and the side-walls 3A, 33A, 4A, 34A. In this battery array, cooling ducts are established at the side-walls of the external case, and battery blocks housed in the external case can be efficiently cooled.

In the car battery array, an electronic component case 10 to hold electronic components can be disposed outside an external case side-wall 4A, which establishes a side cooling duct 8A and is outside that side cooling duct 8A. In this battery array, since the electronic component case is attached outside a side cooling duct as well as outside an external case side-wall, electronic components can be held in the electronic component case while isolating the heat from those electronic components.

First Embodiment

Figure 2:
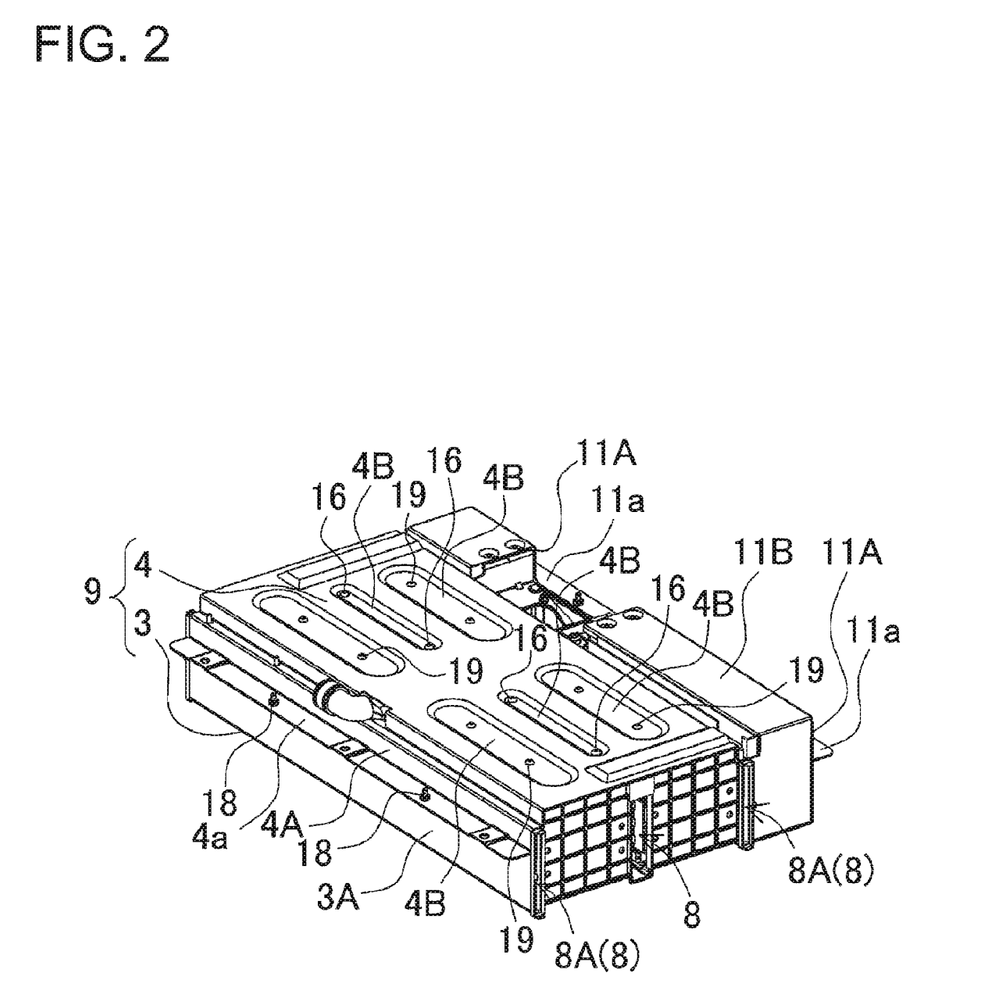
FIG. 2 is a perspective view of a car battery array for the first embodiment of the present invention.
Figure 3:
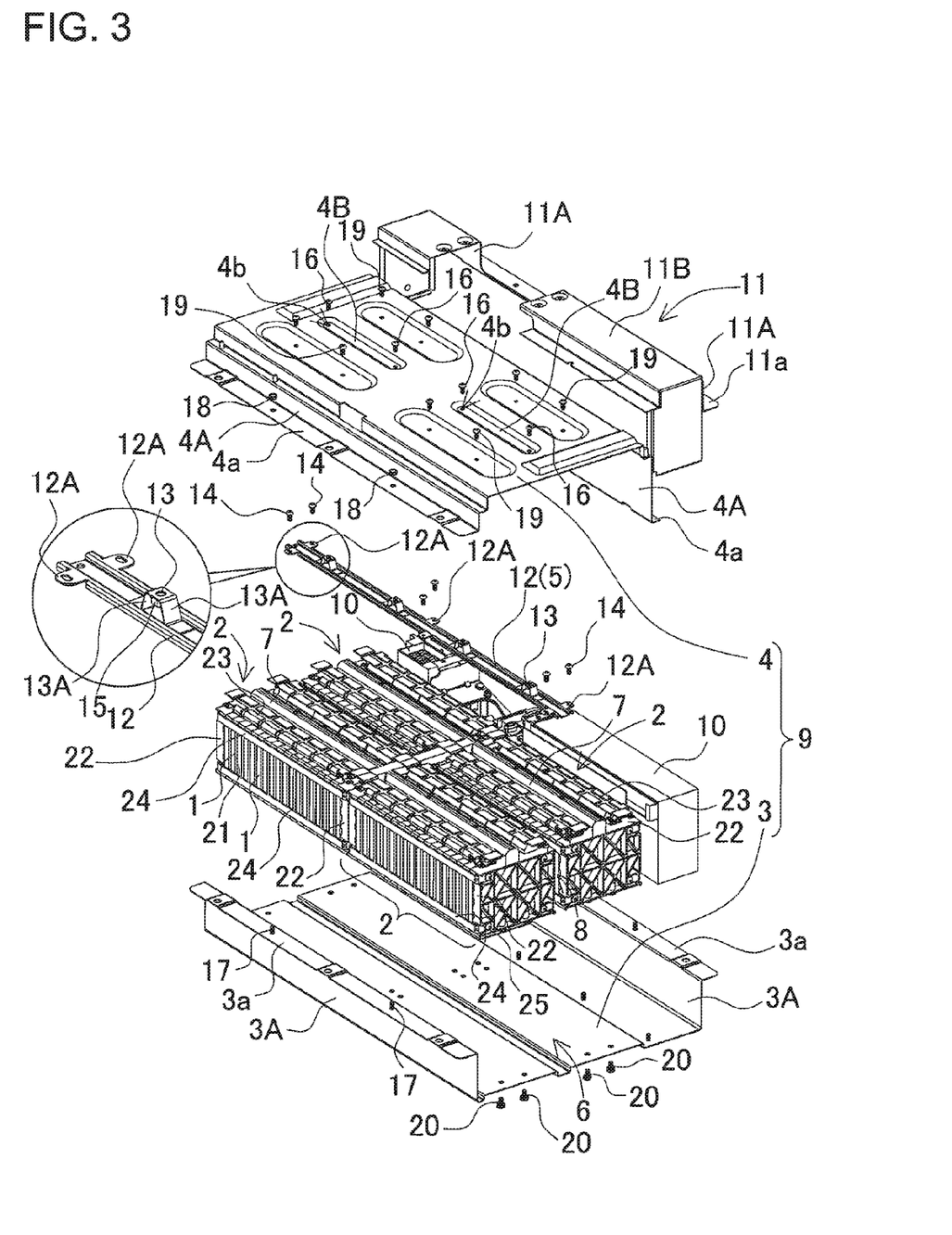
FIG. 3 is an exploded perspective view of the car battery array shown in FIG. 2.
Figure 4:
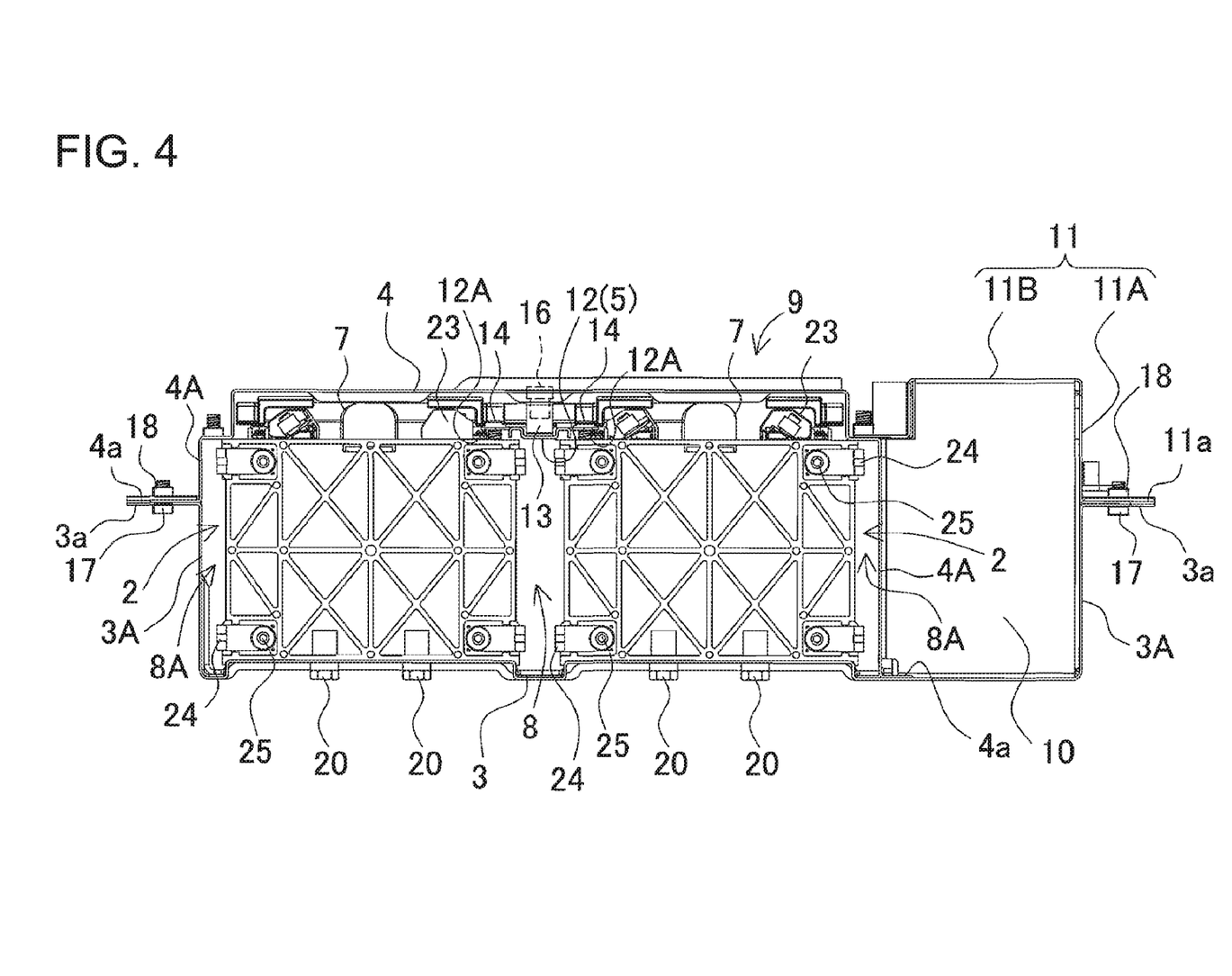
FIG. 4 is a lateral cross-sectional view of the car battery array shown in FIG. 2.

The following describes embodiments based on the figures. The car battery array shown in FIGS. 2-4 is provided with battery blocks 2 having a plurality of connected batteries 1; a first load-bearing plate 3 on which the battery blocks 2 are mounted; a second load-bearing plate 4 that covers the tops of the battery blocks 2 and attaches to both sides of the first load-bearing plate 3; and a reinforcing rod 5 disposed between, and connected to the second load-bearing plate 4 and the battery blocks 2 to connect the second load-bearing plate 4 to the battery blocks 2.

(Battery Blocks)

A battery block 2 has a plurality of battery cells 1 disposed in a stacked fashion via separators 21 with both ends of the stack sandwiched between endplates 22. A battery block 2 has a plurality of battery cells 1 disposed next to each other and electrode terminals (not illustrated) of adjacent battery cells 1 are connected together. Electrode terminals of adjacent battery cells 1 are stacked together, and the stacked electrode terminals are fastened together with connecting hardware for electrical connection.

The battery cells 1 are rectangular batteries. A rectangular battery has a rectangular external case with an open end that is hermetically closed off (in an air-tight and fluid-tight fashion) by a sealing plate. Rectangular batteries can be positioned more efficiently than circular cylindrical batteries and can increase the energy density (per unit volume). This is particularly desirable for automotive applications that have reduced space and demand a small footprint. Rectangular rechargeable batteries such as lithium ion rechargeable batteries can be used as the battery cells 1. Rechargeable batteries such as nickel-based batteries can also be used. The electrode terminals of the battery cells 1 are connected in series or parallel.

A battery cell 1 has a closed-bottom external case made of metal, such as aluminum, that is sealed closed at the top with a sealing plate made of metal, such as aluminum. Sealing plate perimeter edges are laser-welded to the open end of the external case to attach the sealing plate to the open end of the external case in a hermetic fashion. The sealing plate has positive and negative electrode terminals attached at both ends, and electrode terminals of adjacent battery cells 1 are joined to connect the batteries in series. Interconnected electrode terminals at both ends of battery external cases are enclosed by terminal covers 23.

Terminal covers 23 enclose the outside of the electrode terminals to cover the electrode terminals and connect exposed conducting regions in an insulating fashion. The terminal covers 23 are formed from insulating material such as plastic. A battery block is provided with two rows of terminal covers 23 on its upper surface, and an exhaust duct 7 is disposed between the rows of the terminal cover 23 to exhaust gas discharged from safety valves (not illustrated) to the outside. An exhaust duct 7 is disposed at the center of a battery block 2 extending in the lengthwise direction, and both ends of the exhaust duct 7 are connected to endplates 22. An exhaust duct 7 is made of sheet metal formed in a rail-shape with the open-side down and attached to endplates 22 to position it on the upper surface of a battery block 2. The exhaust duct 7 is mounted on a battery block 2 in a manner that encloses safety valve openings provided on the upper surfaces of the battery cells 1. Each battery cell 1 has a safety valve opening established in the center region of the sealing plate on its upper surface. If the internal pressure of a battery cell rises above a set pressure, the safety valve will open. If a safety valve opens, gas or electrolyte solution is discharged from inside the battery cell 1. This gas or electrolyte solution is discharged into an exhaust duct 7, passes through the exhaust duct 7, and is exhausted outside the battery array.

Separators 21 are sandwiched between adjacent battery cells 1. A separator 21 has a rectangular shape and outline equivalent to the battery cell 1 size. Separators 21 are inserted between battery cells 1 and insulate those battery cells 1. A separator 21 is made of insulating material with exceptional heat resistance and thermal insulating properties, and preferably is made of a light inexpensive resin. For example, a synthetic resin with low thermal conductivity (preferably 0.5 W/m or less) such as polypropylene or polyurethane can be used. Consequently, separators 21 protect the battery cells 1, and insulate and stop heat conduction between adjacent battery cells 1. In addition, separators 21 have ridges with alternate projections and troughs, and battery cells 1 are cooled on both sides by passing a cooling medium through those troughs.

A battery block 2 has separators 21 and battery cells 1 alternately stacked, and both ends of the stack are sandwiched between a pair of endplates 22. Endplates 22 are formed entirely from plastic, or they are made by insertion molding metal to reinforce the plastic. The endplates 22 of the figures have an outline equivalent to the battery cell outline, and are formed with a size that can cover battery cells 1 exposed at both ends of the battery cell-separator stack. The pair of endplates 22 is connected by tie-rods 24 to fasten the stack of battery cells 1 and separators 21 between the endplates 22. Each endplate 22 is provided with a pair of screw holes on both sides for attachment of the tie-rods 24. Set screws 25 are passed through holes in the ends of the tie-rods 24 and screwed into the endplate screw holes to fasten a pair of endplates 22 together and form a battery block 2.

(First Load-Bearing Plate and Second Load-Bearing Plate)

The first load-bearing plate 3 and the second load-bearing plate 4 are joined together to form the external case 9, and battery blocks 2 are disposed inside the external case 9. The first load-bearing plate 3 and the second load-bearing plate 4 are metal plates strong enough to support the weight of the battery blocks 2 housed inside. The first load-bearing plate 3 and the second load-bearing plate 4 are made from metal plates with the same thickness, or the first load-bearing plate 3 is made from thicker metal plate than the second load-bearing plate 4. The battery array has a plurality of battery blocks 2 arranged in rows and columns inside the external case 9. The battery array shown in the exploded perspective view of FIG. 3 has two rows of two battery blocks 2 each arranged in straight lines to house a total of four battery blocks 2 on the first load-bearing plate 3. Battery blocks 2 disposed in two rows are separated to establish cooling ducts 8 between the rows.

The first load-bearing plate 3 and the second load-bearing plate 4 are metal plates formed in trough-shapes. The first load-bearing plate 3 and the second load-bearing plate 4 are provided with side-walls 3A, 4A on both sides to form trough-shapes. In the battery array of FIG. 3, the lateral width of the first load-bearing plate 3 is greater than that of the second load-bearing plate 4, and an electronic component case 10 is disposed between a first load-bearing plate side-wall 3A and a second load-bearing plate side-wall 4A. The first load-bearing plate 3 is wider than the second load-bearing plate 4 by an amount equal to the width of the electronic component case 10. Specifically, the width of the first load-bearing plate 3 is equal to the width of the second load-bearing plate 4 plus the width of the electronic component case 10.

A side-wall 3A of the first load-bearing plate 3 on one side, which is the left side in FIGS. 2 and 3, is attached to the left side-wall 4A of the second load-bearing plate 4. The second load-bearing plate side-wall 4A on the right side is attached to the base section of the first load-bearing plate 3 to separate the battery block storage compartment 6 from the electronic component case 10. The right side-wall 4A of the second load-bearing plate 4 is longer than the left side-wall 4A to allow the end of the side-wall 4A to be attached to the base section of the first load-bearing plate 3. Attachment edges of the first load-bearing plate 3 and the second load-bearing plate 4 are provided with outwardly bent flanges 3a, 4a. Flanges 3a, 4a are connected by screws 17 that pass through the flanges 3a, 4a and are held by nuts 18, or are attached by rivets that pass through the flanges 3a, 4a to join the first load-bearing plate 3 and the second load-bearing plate 4.

In the battery array shown in FIGS. 3 and 4, the first load-bearing plate 3 is provided with side-walls 3A of approximately the same height on both sides. In the figures, the left side-wall 3A of the first load-bearing plate 3 is attached to the left side-wall 4A of the second load-bearing plate 4. The right side-wall 3A of the first load-bearing plate 3 is not attached to the side-wall 4A of the second load-bearing plate, but rather is fastened to a side-wall 11A of an attachment plate 11 for the electronic component case 10, which is attached to the second load-bearing plate 4. The second load-bearing plate 4 also has side-walls 4A on both sides. The second load-bearing plate 4 of the figures has a right side-wall 4A that is longer than the left side-wall 4A. The shorter left side-wall 4A is attached to the left side-wall 3A of the first load-bearing plate 3, and the longer right side-wall 4A is attached to the base section of the first load-bearing plate 3.

In the figures, the attachment plate 11 of the electronic component case 10 is attached to the upper end of the right side-wall 4A of the second load-bearing plate 4. This attachment plate 11 is a metal plate formed in an L-shape and provided with a top plate 11B and a side-wall 11A on one side. The edge of the top plate 11B is attached to the upper end of the second load-bearing plate side-wall 4A, and a flange 11a provided on the bottom edge of the side-wall 11A is attached to the upper edge of the first load-bearing plate right side-wall 3A. In this external case 9 configuration, the side-wall 4A provided on the right side of the second load-bearing plate 4 separates the electronic component case 10 from the battery block storage compartment 6.

The external case 9, which is made up of the first load-bearing plate 3 and the second load-bearing plate 4, is made wider than the outer sides of the battery blocks 2 to allow room for cooling ducts 8. In the battery array of FIG. 4, a cooling duct 8 is provided at the center between the two rows of battery blocks 2, and cooling ducts 8 are also provided between the outside of the battery blocks 2 and the side-walls 3A, 4A. In this battery array, either the center cooling duct 8 between the two rows of battery blocks 2 or the pair of cooling ducts 8 on the outside of the battery blocks 2 is used as a cooling air supply duct, and the other duct or pair of ducts is used as an exhaust duct. Cooling air is passed through the separators 21 between battery cells 1 to cool the battery cells 1.

The battery array shown in the cross-section of FIG. 4 is provided with a side cooling duct 8A between the outer side (the right side in FIG. 4) of the battery blocks 2 and the second load-bearing plate side-wall 4A. The electronic component case 10 for housing electronic components is disposed outside the external case side-wall 4A, which is outside the side cooling duct 8A and forms a wall of the side cooling duct 8A. In this structure, a side cooling duct 8A and side-wall 4A are provided between the electronic components (not illustrated) housed in the electronic component case 10 and the battery blocks 2. In this configuration, the battery blocks 2 do not heat the electronic components, and detrimental effects on the electronic components due to heat generated by the battery blocks 2 can be prevented.

The open top of the cooling duct 8 established between the two rows of battery blocks 2 is closed off by a cooling duct sealing plate 12, and the open bottom of the cooling duct 8 is closed off by the first load-bearing plate 3. The cooling duct sealing plate 12 is a narrow metal plate that extends along the cooling duct 8 established at the center between the two battery block 2 rows. The sealing plate 12 is attached on both sides to battery blocks 2 to close off the open top of the cooling duct 8. The sealing plate 12 is attached with set screws 14 to the end-plates 22 of battery blocks 2 disposed on both sides. The sealing plate 12 is provided with projections 12A on both sides for attachment to the end-plates 22, and the projections 12A are provided with through-holes for insertion of the set screws 14. The sealing plate 12 of FIG. 3 is provided with projections 12A on both sides at both ends and on both sides at two intermediate locations for attachment to the battery blocks 2.

This cooling duct sealing plate 12 is attached to the bottom surface of the second load-bearing plate 4, and serves the dual purpose as the reinforcing rod 5 that connects the second load-bearing plate 4 to the battery blocks 2. The cooling duct sealing plate 12 serving as the reinforcing rod 5 can be a metal plate formed in a rail shape to increase its bending strength. The cooling duct sealing plate 12 has fastening nuts 15 mounted above its upper surface to attach the second load-bearing plate 4 with separation from the top of the batteries 1. The fastening nuts 15 are mounted with separation above the cooling duct sealing plate 12 via mounting pieces 13. In each mounting piece 13, a nut 15 is welded to the bottom surface at the center of the upward projecting mounting piece 13, mounting legs 13A are provided on both ends, and the bottom ends of the mounting legs 13A are welded to the cooling duct sealing plate 12. Set screws 16 that pass through the second load-bearing plate 4 are screwed into the cooling duct sealing plate 12 to attach it to the second load-bearing plate 4.

Further, in the figures, the sections of the second load-bearing plate 4 that are connected to the cooling duct sealing plate 12 have trough-shaped depressions that protrude downward. In the bottoms 4B of these trough-shaped depressions, through-holes 4b are provided for set screw 16 insertion. Set screws 16 inserted in the through-holes 4b are screwed into the fastening nuts 15 mounted on the cooling duct sealing plate 12 to attach the second load-bearing plate 4 to the cooling duct sealing plate 12, which is the reinforcing rod 5.

In the battery array of FIGS. 3 and 4, since the reinforcing rod 5 that connects the second load-bearing plate 4 to the battery blocks 2 uses the cooling duct sealing plate 12 for a dual purpose, there is no need to provide a special-purpose reinforcing rod to attach the second load-bearing plate 4 to the battery blocks 2, and the overall structure can be simplified. Further, since the cooling duct sealing plate 12 extends along the center of the second load-bearing plate 4 in the lengthwise direction, its attachment reinforces the second load-bearing plate 4.

Further, the second load-bearing plate 4 has its bottom surface attached via set screws 19 to exhaust ducts 7 disposed on top of the battery blocks 2. In the figures, sections of the second load-bearing plate 4 that connect to the exhaust ducts 7 are formed with trough-shaped depressions that protrude downward. Through-holes are provided in these trough-shaped depressions for insertion of set screws 19. The set screws 19 inserted in the through-holes are screwed into the exhaust ducts 7 to attach the second load-bearing plate 4 to the exhaust ducts 7. Since the second load-bearing plate 4, described above, is formed with side-walls 4A on both sides and trough-shaped depressions in sections attached to the cooling duct sealing plate 12 and exhaust ducts 7, the side-walls 4A and trough-shaped formations in the base section improve the strength of the second load-bearing plate 4, and bending strength in particular.

In the battery array shown in FIGS. 3 and 4, the bottoms of the battery blocks 2 are attached to the first load-bearing plate 3 by set screws 20, and the tops of the battery blocks 2 are attached to the reinforcing rod 5 by set screws 14. As shown in FIG. 4, battery block bottom attachment points for the first load-bearing plate 3 and top attachment points for the reinforcing rod 5 are offset in the lateral direction of the external case 9. Specifically, the tops of the battery blocks 2 are attached to the reinforcing rod 5 at points offset from directly above the bottom attachment points. In the battery array of FIG. 4, one end of each endplate 22 is attached to the reinforcing rod 5 at the top, and two intermediate points on each endplate 22 are attached to the first load-bearing plate 3 at the bottom.

Second Embodiment

Figure 5:
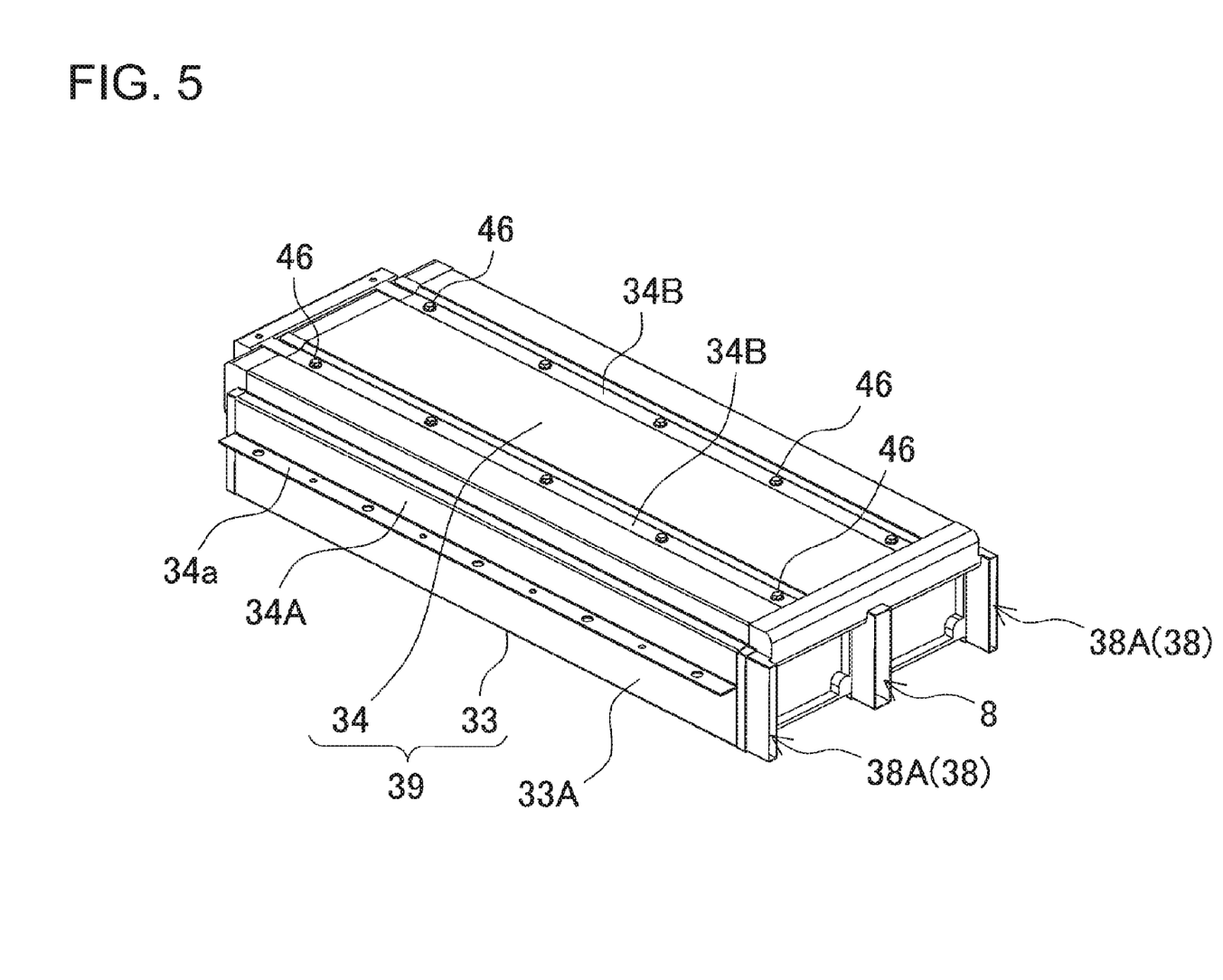
FIG. 5 is an a perspective view of a car battery array for the second embodiment of the present invention.
Figure 6:
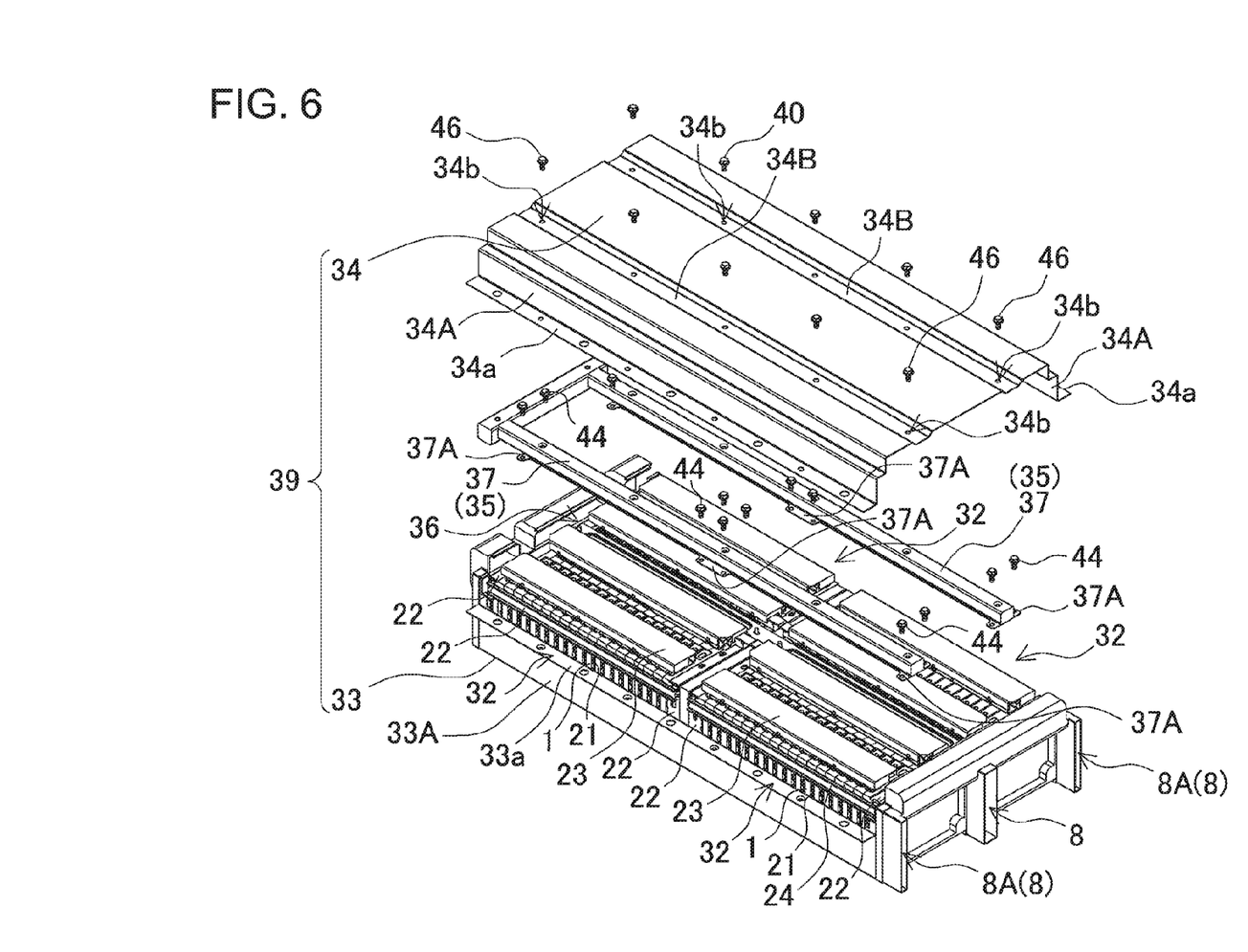
FIG. 6 is an exploded perspective view of the car battery array shown in FIG. 5.

The car battery array shown in FIGS. 5 and 6 has a first load-bearing plate 33 and second load-bearing plate 34 that are trough-shaped metal plates with the same width. The first load-bearing plate 33 and second load-bearing plate 34 are connected together at side-walls 33A, 34A on both sides to form an external case 39 provided with a battery block storage compartment 36. Attachment edges of the side-walls 33A, 34A are provided with outwardly bent flanges 33a, 34a. Flanges 33a, 34a are connected by screws (not illustrated) that pass through the flanges 33a, 34a and are held by nuts (not illustrated), or are attached by rivets that pass through the flanges 33a, 34a to join the first load-bearing plate 33 and the second load-bearing plate 34. In the same manner as the battery array of FIG. 3, the external case 39 houses two rows of two battery blocks 32 each arranged in straight lines to hold a total of four battery blocks 32. A cooling duct 38 is established between the two rows of battery blocks 32, and side cooling ducts 38A are established between the outside of the battery blocks 32 and the side-walls 33A, 34A.

Exhaust ducts 37 are attached at the centers of the tops of the two rows of battery blocks 32. These exhaust ducts 37 are metal plates formed in rail-shapes with the open-sides down, and are disposed at the center of each row of battery blocks 32. These rail-shaped metal plate exhaust ducts 37 are attached to the second load-bearing plate 34 and reinforce the second load-bearing plate 34. Since the battery of FIG. 6 has an external case 39 housing two rows of battery blocks 32, two longitudinal exhaust ducts 37 are provided. These exhaust ducts 37 are attached to the bottom surface of the second load-bearing plate 34 and serve the dual purpose as reinforcing rods 35 that attach the second load-bearing plate 34 to the battery blocks 32. The rail-shaped exhaust ducts 37 are provided with projections 37A that protrude from the sides of the exhaust ducts 37 at both ends and at intermediate locations. These projections 37A are provided at locations allowing the exhaust ducts 37 to be attached to battery block 32 endplates 22. Through-holes are provided through the exhaust duct projections 37A. Set screws 44 are inserted through the through-holes and screwed into the endplates 22 to attach the exhaust ducts 37 to battery block endplates 22.

The exhaust ducts 37 that serve as reinforcing rods 35 to attach the second load-bearing plate 34 to the battery blocks 32 have fastening nuts (not illustrated) welded to their upper surfaces. Set screws 46 that pass through the second load-bearing plate 34 are screwed into these nuts to attach the second load-bearing plate 34 to the exhaust ducts 37. The second load-bearing plate 34 is formed with trough-shaped depressions protruding downward at exhaust duct attachment locations. Through-holes 34b for set screw insertion are provided at the bottoms 34B of these depressions. Set screws 46 inserted through the through-holes 34b are screwed into the nuts mounted on the exhaust ducts 37 to attach the second load-bearing plate 34 to the exhaust ducts 37, which are the reinforcing rods 35. Since the second load-bearing plate 34 described above is formed with side-walls 34A on both sides and trough-shaped depressions in sections attached to the exhaust ducts 37, the side-walls 34A and trough-shaped formations in the base section improve the strength of the second load-bearing plate 34, and bending strength in particular.

In the battery array described above, the second load-bearing plate 34 has an overall trough-shape with side-walls 34A on both sides, and has reinforcing rods 35, which are exhaust ducts 37, disposed between the side-walls 34A and extending in the direction of the side-walls 34A. These reinforcing rods 35 are attached to the battery blocks 32 and to the bottoms 34B of the trough-shaped depressions in the second load-bearing plate 34. In this structure, the second load-bearing plate 34 is fortified by the side-walls 34A on both sides and by the reinforcing rods 35 in between.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2008-177,414 filed in Japan on Jul. 7, 2008, the content of which is incorporated herein by reference.

What is claimed is:

1. A car battery array comprising:
    battery blocks having a plurality of batteries joined together;
    a first load-bearing plate on which the battery blocks are mounted;
    a second load-bearing plate that is attached to both sides of the first load-bearing plate and covers the tops of the battery blocks; and
    a reinforcing rod disposed between the second load-bearing plate and the battery blocks, the reinforcing rod being directly connected to both the second load-bearing plate and the battery blocks to connect the second load-bearing plate to the battery blocks;
    wherein, with the first load-bearing plate and the second load-bearing plate being connected together at both sides, a battery compartment is established inside and the battery blocks are disposed in the battery compartment;
    wherein the battery blocks disposed in the battery compartment are mounted on top of the first load-bearing plate and are attached to the second load-bearing plate via the reinforcing rod to support the battery block load with the first load-bearing plate and the second load-bearing plate.

2. The car battery array as recited in claim 1, wherein the second load-bearing plate has a trough-shape with side-walls on both sides, the reinforcing rod is disposed in a base section of the second load-bearing plate between the two side-walls extending in a lengthwise direction of the side-walls, and the reinforcing rod is attached to the battery blocks and to the base section of the second load-bearing plate.

3. The car battery array as recited in claim 1, wherein the first load-bearing plate and the second load-bearing plate are trough-shaped metal plates.

4. The car battery array as recited in claim 1, wherein the battery blocks are provided with a plurality of battery cells stacked together, with endplates that sandwich both ends of a battery cell stack, and the first load-bearing plate and the second load-bearing plate are attached to the battery block endplates.

5. The car battery array as recited in claim 4, wherein the reinforcing rod extends in a direction of the stacked battery cells and is attached to the second load-bearing plate.

6. The car battery array as recited in claim 4, further comprising a second reinforcing rod, wherein the reinforcing rods are exhaust ducts for gas discharged from the battery blocks, and the exhaust duct reinforcing rods are attached to the endplates and the second load-bearing plate to attach the second load-bearing plate to the battery blocks.

7. The car battery array as recited in claim 6, wherein the exhaust ducts serving the dual purpose as reinforcing rods are attached to battery block endplates.

8. The car battery array as recited in claim 6, wherein the exhaust ducts serving the dual purpose as reinforcing rods are disposed as parallel exhaust ducts, and the exhaust ducts reinforce the second load-bearing plate.

9. The car battery array as recited in claim 6, wherein the exhaust ducts serving the dual purpose as reinforcing rods are attached to the second load-bearing plate via set screws inserted through the second load-bearing plate.

10. The car battery array as recited in claim 4, wherein the battery blocks are disposed in a plurality of rows and mounted between the first load-bearing plate and the second load-bearing plate, cooling ducts are established between adjacent battery blocks, a cooling duct sealing plate that closes off the top of one of the cooling ducts is the reinforcing rod, and the reinforcing rod as the cooling duct sealing plate is attached to the battery block endplates and to the second load-bearing plate to attach the second load-bearing plate to the battery blocks.

11. The car battery array as recited in claim 10, wherein the cooling duct sealing plate serving the dual purpose as the reinforcing rod is a metal plate formed in a rail-shape.

12. The car battery array as recited in claim 10, wherein the cooling duct sealing plate serving the dual purpose as the reinforcing rod is attached via set screws to tops of the endplates of the battery blocks on both sides of the cooling duct.

13. The car battery array as recited in claim 10, wherein the cooling duct sealing plate serving the dual purpose as the reinforcing rod has fastening nuts mounted with separation above the cooling duct sealing plate via mounting pieces having mounting legs, and set screws inserted through the second load-bearing plate are screwed into the fastening nuts to attach the cooling duct sealing plate to the second load-bearing plate via the set screws.

14. The car battery array as recited in claim 10, wherein the cooling duct sealing plate serving the dual purpose as the reinforcing rod extends in a lengthwise direction along a center of the second load-bearing plate to reinforce the second load-bearing plate.

15. The car battery array as recited in claim 1, wherein the second load-bearing plate has trough-shape depressions protruding downward in sections attached to the reinforcing rod, through-holes are provided for set screw insertion at the bottoms of those trough-shaped depressions, and set screws inserted through the through-holes are screwed into the reinforcing rod to attach the reinforcing rod to the second load-bearing plate.

16. The car battery array as recited in claim 1, wherein tops of the battery blocks are attached to the reinforcing rod at attachment points offset from directly above bottom attachment points where bottoms of the battery blocks are attached to the first load-bearing plate.

17. The car battery array as recited in claim 1, wherein the first load-bearing plate and the second load-bearing plate have trough-shapes with side-walls, the side-walls of the second load-bearing plate are attached to the first load-bearing plate side-walls or a base section of the first load-bearing plate to form an external case having a battery block storage compartment, and the side-walls of the external case are separated from the side surfaces of the battery blocks to establish side cooling ducts between the battery blocks and the side-walls.

18. The car battery array as recited in claim 17, wherein an electronic component case for housing electronic components is disposed outside one of the side cooling ducts and outside the external case side-wall that establishes that side cooling duct.

19. The car battery array as recited in claim 1, wherein the reinforcing rod is disposed apart from the first load-bearing plate.

20. A car battery array comprising: battery blocks having a plurality of batteries joined together; a first load-bearing plate on which the battery blocks are mounted; a second load-bearing plate that is attached to both sides of the first load-bearing plate and covers the tops of the battery blocks; and a reinforcing rod disposed between the second load-bearing plate and the battery blocks, the reinforcing rod being connected to both the second load-bearing plate and the battery blocks to connect the second load-bearing plate to the battery blocks; wherein the reinforcing rod is elongated in a direction such that the reinforcing rod extends longitudinally along a bottom surface of the second load-bearing plate; wherein, with the first load-bearing plate and the second load-bearing plate being connected together at both sides, a battery compartment is established inside and the battery blocks are disposed in the battery compartment; wherein the battery blocks disposed in the battery compartment are mounted on top of the first load-bearing plate and are attached to the second load-bearing plate via the reinforcing rod to support the battery block load with the first load-bearing plate and the second load-bearing plate.

* * * * *